United States Patent
Ha et al.

(10) Patent No.: US 10,205,143 B2
(45) Date of Patent: Feb. 12, 2019

(54) BATTERY PACK

(71) Applicant: LG CHEM, LTD., Seoul (KR)

(72) Inventors: Byeo-Ri Ha, Daejeon (KR); Jung-Min Park, Daejeon (KR); Dong-Yeon Kim, Daejeon (KR); Jeong-In Pak, Daejeon (KR); Seung-Hun Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 251 days.

(21) Appl. No.: 15/321,450

(22) PCT Filed: Jan. 8, 2016

(86) PCT No.: PCT/KR2016/000191
§ 371 (c)(1),
(2) Date: Dec. 22, 2016

(87) PCT Pub. No.: WO2016/186290
PCT Pub. Date: Nov. 24, 2016

(65) Prior Publication Data
US 2017/0214009 A1  Jul. 27, 2017

(30) Foreign Application Priority Data

May 18, 2015 (KR) .................. 10-2015-0068984

(51) Int. Cl.
*H01M 2/10* (2006.01)
*H01M 10/04* (2006.01)

(52) U.S. Cl.
CPC ........... *H01M 2/1022* (2013.01); *H01M 2/10* (2013.01); *H01M 2/1016* (2013.01); *H01M 2/1077* (2013.01); *H01M 10/0481* (2013.01)

(58) Field of Classification Search
CPC .... H01M 2/10; H01M 2/1016; H01M 2/1022; H01M 2/1077; H01M 10/0481

(Continued)

(56) References Cited

U.S. PATENT DOCUMENTS 8,999,557 B2   4/2015  Kim
2011/0262797 A1  10/2011  Kim
(Continued)

FOREIGN PATENT DOCUMENTS

EP   1 852 925 A1   11/2007
EP   2 337 112 A1    6/2011
(Continued)

OTHER PUBLICATIONS

Machine Translation of JP2012243534 originally published on Dec. 10, 2012 to Fujii.*
(Continued)

*Primary Examiner* — Jonathan G Leong
(74) *Attorney, Agent, or Firm* — Morgan, Lewis & Bockius LLP

(57) ABSTRACT

Disclosed is a battery pack, which includes a battery module assembly; a first end plate and a second end plate respectively installed at the battery module assembly; a first pressure adjustment bar fixed to the first end plate; and a second pressure adjustment bar fixed to the second end plate, wherein the first pressure adjustment bar includes an accommodation space formed so that the second pressure adjustment bar is slidably inserted therein; and a plurality of hook holes formed along a sliding direction of the second pressure adjustment bar, wherein the second pressure adjustment bar has an elastic hook elastically coupled to any one of the hook holes selectively so that when the second pressure adjustment bar slides along the accommodation space, the second pressure adjustment bar is released from any one of the hook holes and then coupled to another one of the hook holes. Since the interval between the end plates is automatically adjusted step by step, the pressure between the battery module assembly and the end plates may be automatically maintained consistently.

7 Claims, 6 Drawing Sheets

(58) Field of Classification Search
USPC .......................................... 429/151, 157, 159
See application file for complete search history.

(56) References Cited

U.S. PATENT DOCUMENTS

2013/0252063 A1* 9/2013 Park .................. H01M 2/14
  429/120
2014/0333238 A1 11/2014 Yokoyama

FOREIGN PATENT DOCUMENTS

| EP | 2 624 334 A2 | 8/2013 |
|---|---|---|
| JP | 2009-238606 A | 10/2009 |
| JP | 2012-243534 A | 12/2012 |
| KR | 10-2006-0103634 A | 10/2006 |
| KR | 10-2007-0101025 A | 10/2007 |
| KR | 10-2011-0117585 A | 10/2011 |
| KR | 10-1097229 B1 | 12/2011 |

OTHER PUBLICATIONS

International Search Report and Written Opinion dated Apr. 29, 2016, in Application No. PCT/KR2016/000191 (with Engl. translation of SR).

* cited by examiner

BATTERY PACK

TECHNICAL FIELD

The present application claims priority under 35 U.S.C. § 119 to Korean Patent Application No. 10-2015-0068984 filed on May 18, 2015 in the Republic of Korea, and under 35 U.S.C. § 365 to PCT/KR2016/000191, filed on Jan. 8, 2016, the disclosures of which are incorporated herein by reference.

The present disclosure relates to a battery pack having a plurality of secondary batteries.

BACKGROUND ART

A secondary battery having easy application to various product groups and good electric characteristics such as high energy density is widely used not only for portable devices but also for electric vehicles (EV) or hybrid electric vehicles (HEV), which are driven by an electric driving source. The secondary battery receives great attention as a new energy source for natural-friendly property and enhanced energy efficiency since it gives a primary advantage of greatly reducing the use of fossil fuel and also does not generate byproducts at all in use.

Currently, lithium ion batteries, lithium polymer batteries, nickel cadmium batteries, nickel hydride batteries, nickel zinc batteries, or the like are widely used as secondary batteries. Such a unit secondary battery cell has an operating voltage of about 2.5V to 4.2V. Therefore, if higher output voltage is demanded, a plurality of secondary battery cells may be connected in series to configure a battery pack. In addition, according to a charging/discharging capacity demanded at the battery pack, a plurality of secondary battery cells may be connected in parallel to configure the battery pack. Therefore, the number of secondary battery cells included the battery pack may be set variously depending on the demanded output voltage or charging/discharging capacity.

Meanwhile, when a battery pack is configured by connecting a plurality of secondary battery cells in series or in parallel, in general cases, a battery module including at least two secondary battery cells is configured first, then a battery module assembly is configured using a plurality of battery modules, and then other components are added to the battery module assembly to configure a battery pack.

The battery pack includes a battery module assembly having a plurality of secondary batteries, an upper plate provided at an upper portion of the battery module assembly, a lower plate provided at a lower portion of the battery module assembly, and a coupling member for coupling the upper plate and the lower plate. The upper plate and the lower plate may fix the outer appearance of the battery module assembly and protect the battery module assembly against external impacts.

However, if the secondary battery included in the battery module assembly is a pouch-type lithium polymer secondary battery, the internal electrolyte may be decomposed due to side reactions caused by repeated charging and discharging, which may generate gas. At this time, the generated gas may deform the outer appearance of the secondary battery cell, which is called 'swelling phenomenon'.

Due to the swelling phenomenon, in charging, the battery module assembly is expanded to increase the pressure applied to the upper and lower plates by the battery module assembly. If so, other structures such as the coupling member, provided at the battery pack, may also be deformed.

In order to prevent the battery pack from having deteriorated performance due to such a swelling phenomenon, when the upper and lower plates are designed, their rigidity is set in consideration of swelling phenomenon. However, just with the rigidity design in consideration of allowance, material, thickness, shape or the like of the upper and lower plates, there is a limit in preventing the performance deterioration of the battery pack caused by the swelling phenomenon.

DISCLOSURE

Technical Problem

The present disclosure is designed to solve the problems of the related art, and therefore the present disclosure is directed to providing a battery pack having an improved structure to minimize performance deterioration of the battery pack caused by the swelling phenomenon.

Technical Solution

In one aspect of the present disclosure, there is provided a battery pack, comprising: a battery module assembly having a plurality of secondary batteries; a first end plate installed at one end of the battery module assembly; a second end plate installed at the other end of the battery module assembly, which is opposite to the one end; a first pressure adjustment bar fixed to the first end plate to be located between the first end plate and the second end plate; and a second pressure adjustment bar fixed to the second end plate to be slidably inserted into the first pressure adjustment bar, wherein the first pressure adjustment bar includes: an accommodation space formed so that the second pressure adjustment bar is slidably inserted therein; and a plurality of hook holes formed along a sliding direction of the second pressure adjustment bar to communicate with the accommodation space, wherein the second pressure adjustment bar has an elastic hook elastically coupled to any one of the hook holes selectively so that when the second pressure adjustment bar slides along the accommodation space, the second pressure adjustment bar is released from any one of the hook holes and then coupled to another one of the hook holes.

Preferably, there may be provided a plurality of elastic hooks, and the number of the elastic hooks may be smaller than the number of the hook holes.

Preferably, the hook holes may be formed at a predetermined interval, and the elastic hooks may be formed at an interval corresponding to an integer multiple of the predetermined interval of the hook holes.

Preferably, the elastic hook may be formed to be elastically deformable and have an end eccentrically inclined toward the first end plate.

Preferably, the battery pack may further include a restoration member configured to give a restoration force in a direction along which so that the first end plate and the second end plate approach each other.

Preferably, the restoration member may be made of a tension spring.

Preferably, the restoration member may be accommodated in the accommodation space and have one end fixed to the first pressure adjustment bar and the other end fixed to the second pressure adjustment bar.

Advantageous Effects

The battery pack according to the present disclosure may automatically maintain a pressure between a battery module assembly and end plates consistently by automatically adjusting an interval between the end plates, respectively mounted at both ends of the battery module assembly including a plurality of secondary batteries, step by step.

BEST MODE

Figure 1:
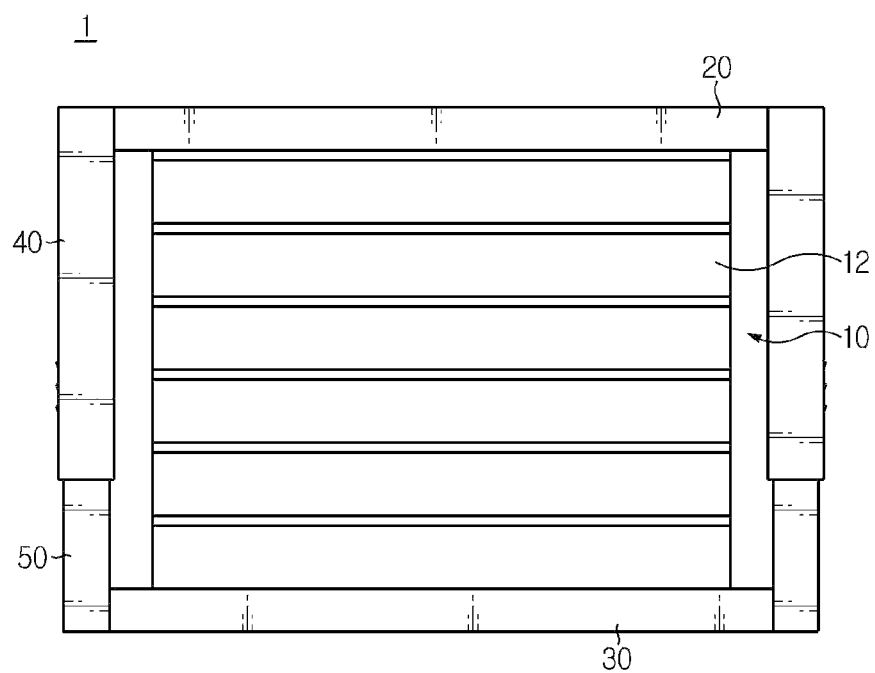
FIG. 1 is a front view showing a battery pack according to an embodiment of the present disclosure.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, each component or a specific portion of each component is depicted in an exaggerated, excluded or simplified state for the convenience of understanding and clarity. Therefore, the size of each component may not fully reflect an actual size. Also, any explanation of the prior art known to relate to the present invention may be omitted if it is regarded to render the subject matter of the present invention vague.

Figure 2:
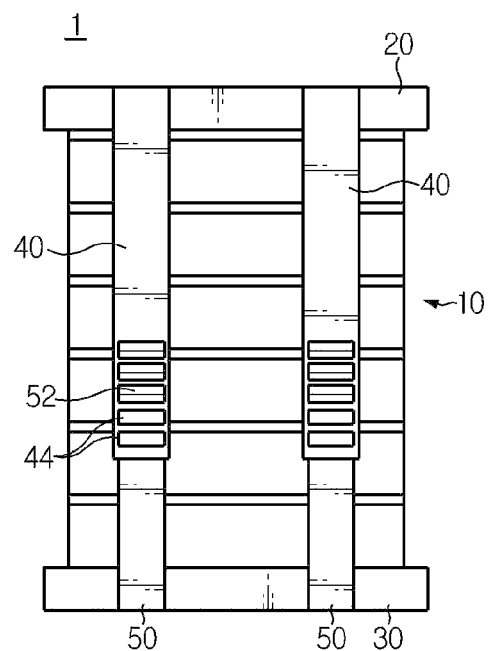
FIG. 2 is a side view showing the battery pack of FIG. 1.

FIG. 1 is a front view showing a battery pack according to an embodiment of the present disclosure, and FIG. 2 is a side view showing the battery pack of FIG. 1. Referring to FIGS. 1 and 2, a battery pack 1 according to an embodiment of the present disclosure includes a battery module assembly 10 having a plurality of secondary batteries; a first end plate 20 provided at one end of the battery module assembly 10; a second end plate 30 provided at the other end of the battery module assembly 10, which is opposite to the one end of the battery module assembly 10; a first pressure adjustment bar 40 and a second pressure adjustment bar 50 respectively coupled to the first end plate 20 and the second end plate 30 to adjust an interval between the first end plate 20 and the second end plate 30 step by step when a swelling phenomenon occurs at the battery module assembly 10; and a restoration member 60 for giving a restoration force in a direction along which the first end plate 20 and the second end plate 30 approach each other.

First, the battery module assembly 10 is a member for storing electric energy. As shown in FIG. 1, the battery module assembly 10 is formed so that a plurality of battery modules 12 are grouped to be stacked vertically and installed to be interposed between the first end plate 20 and the second end plate 30.

The battery module 12 may include a secondary battery cell (not shown) composed of a secondary battery which is rechargeable and should consider a charging or discharging voltage, a module frame (not shown) for fixing the secondary battery cell to configure the battery module 12, a cooling fin (not shown) for emitting heat of the secondary battery cell, or the like.

The kind of the secondary battery cell is not specially limited. For example, the secondary battery cell may be composed of a lithium ion battery, a lithium polymer battery, a nickel cadmium battery, a nickel hydride battery, a nickel zinc battery, or the like. In addition, the shape of the secondary battery cell is not specially limited. For example, the secondary battery cell may have a pouch shape, a cylindrical shape, a rectangular shape, or the like depending on its exterior material. Preferably, the secondary battery cell may have a pouch shape.

Next, the first end plate 20 and the second end plate 30 are members for protecting the battery module assembly 10. As shown in FIG. 1, the first end plate 20 is installed at an upper portion of the battery module assembly 10, and the second end plate 30 is installed at a lower portion of the battery module assembly 10.

In addition, the first end plate 20 is installed in a no-load state, and the second end plate 30 is fixed to an installation target at which the battery pack 1 according to the present disclosure is installed. Therefore, when a swelling phenomenon occurs, the battery module assembly 10 may be expanded in an upper direction of the battery module assembly 10 in a state of being fixed to the installation target by the second end plate 30. In addition, the first end plate 20 and the second end plate 30 may respectively give a mechanical supporting force with respect to the battery module assembly 10 and protect the battery module assembly 10 against external impacts. For this, the first end plate 20 and the second end plate 30 may be made of steel or other metallic materials, which may ensure rigidity, without being limited thereto.

Figure 3:
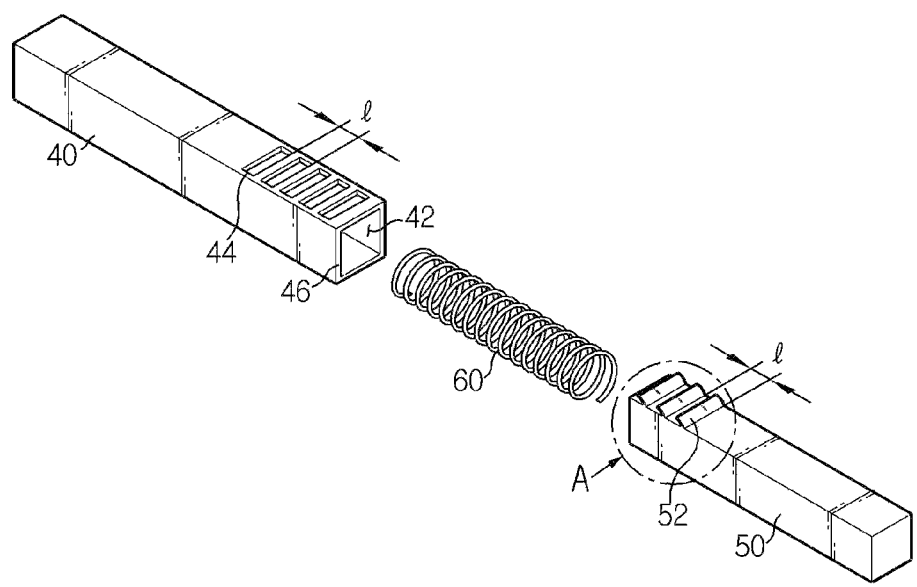
FIG. 3 is an exploded perspective view showing a first pressure adjustment bar, a second pressure adjustment bar and a restoration member.
Figure 4:
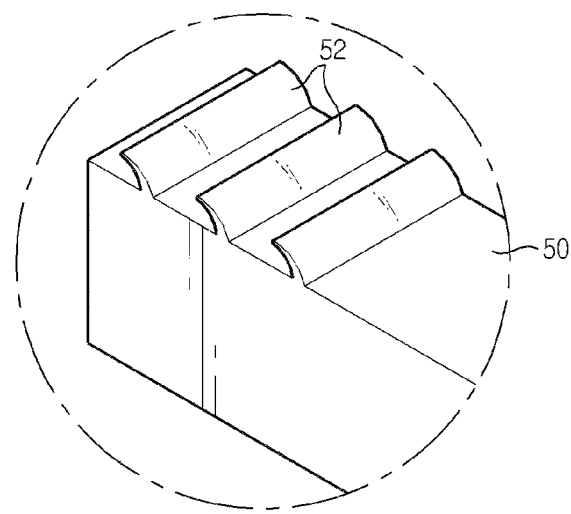
FIG. 4 is a partially enlarged view showing Region A of FIG. 3.
Figure 5:
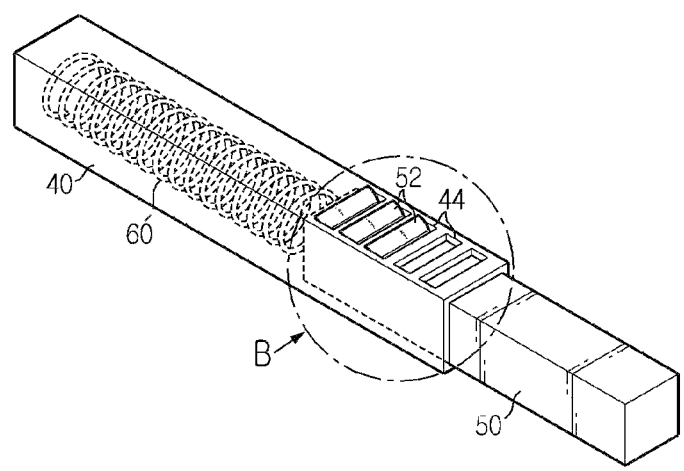
FIG. 5 is a perspective view showing the first pressure adjustment bar, the second pressure adjustment bar and the restoration member of FIG. 3, in an assembled state.
Figure 6:
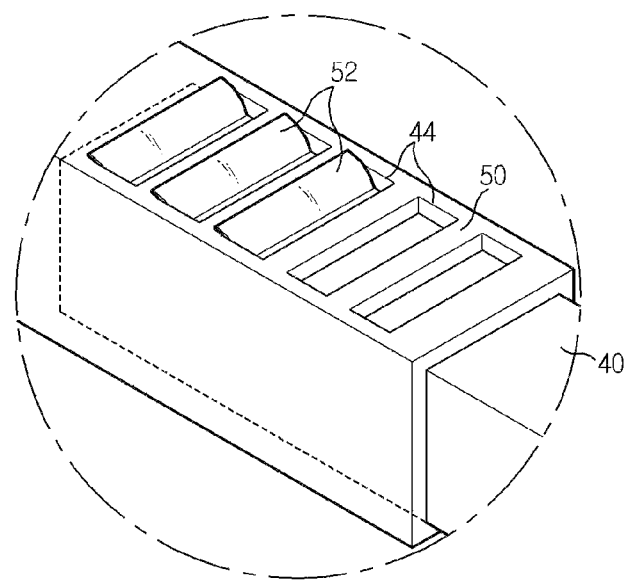
FIG. 6 is a partially enlarged view showing Region B of FIG. 5.

FIG. 3 is an exploded perspective view showing a first pressure adjustment bar, a second pressure adjustment bar and a restoration member, FIG. 4 is a partially enlarged view showing Region A of FIG. 3, FIG. 5 is a perspective view showing the first pressure adjustment bar, the second pressure adjustment bar and the restoration member of FIG. 3, in an assembled state, and FIG. 6 is a partially enlarged view showing Region B of FIG. 5. The first pressure adjustment bar 40 and the second pressure adjustment bar 50 are members for adjusting an interval between the first end plate 20 and the second end plate 30 step by step. In addition, the restoration member 60 is a member for giving a restoration force so that the interval between the first end plate 20 and the second end plate 30 does not increase over a predetermined level.

When the battery module assembly 10 is expanded due to a swelling phenomenon, the first pressure adjustment bar 40, the second pressure adjustment bar 50 and the restoration member 60 are associated to adjust an interval between the first end plate 20 and the second end plate 30 and a pressure applied to the battery module assembly 10. Hereinafter, the first pressure adjustment bar 40, the second pressure adjustment bar 50 and the restoration member 60 will be described in detail with reference to the drawings.

First, the first pressure adjustment bar 40 is fixed to the first end plate 20 so that at least a part of the first pressure adjustment bar 40 is located between the first end plate 20 and the second end plate 30. For example, as shown in FIG. 1, the upper end of the first pressure adjustment bar 40 may be fixed to a side of the first end plate 20 so that its lower end is located between the first end plate 20 and the second end plate 30.

The number of first pressure adjustment bars 40 installed is not specially limited. For example, four first pressure adjustment bars 40 may be installed in total, as shown in FIG. 2, by installing two first pressure adjustment bars 40 at each side of the first end plate 20.

The first pressure adjustment bar 40 may have a square pillar shape, without being limited thereto. In addition, as shown in FIG. 3, the first pressure adjustment bar 40 includes an accommodation space 42 formed therein, a plurality of hook holes 44 formed at a predetermined regular interval (1) to communicate with the accommodation space 42, and an insert hole 46 formed to communicate with the accommodation space 42 so that the second pressure adjustment bar 50 may be inserted into the accommodation space 42.

Next, the second pressure adjustment bar 50 is fixed to the second end plate 30 so that at least a part of the second pressure adjustment bar 50 may be slidably inserted into the accommodation space 42 of the first pressure adjustment bar 40. For example, as shown in FIGS. 1 and 5, the upper portion of the second pressure adjustment bar 50 may be slidably inserted into the accommodation space 42 of the first pressure adjustment bar 40 in a vertical direction of the battery module assembly 10, and the lower end of the second pressure adjustment bar 50 may be fixed to a side of the second end plate 30.

The number of second pressure adjustment bars 50 installed is not specially limited. For example, four second pressure adjustment bars 50 may be installed in total, as shown in FIG. 2, by installing two second pressure adjustment bars 50 at each side of the second end plate 30, identical to the first pressure adjustment bar 40.

The second pressure adjustment bar 50 may have a square pillar shape, without being limited thereto. In addition, as shown in FIG. 3, the second pressure adjustment bar 50 includes at least one elastic hook 52 formed along a vertical direction of the battery module assembly 10.

The number of elastic hooks 52 is not specially limited. For example, as shown in FIG. 3, a plurality of elastic hooks 52 may be formed, but the number of elastic hooks 52 may be smaller than the number of hook holes 44.

The elastic hooks 52 are formed at an interval which corresponds to an integer multiple of the interval (1) of the hook holes 44. For example, as shown in FIG. 3, the elastic hooks 52 may be formed at the same interval (1) as the hook holes 44. Since the elastic hooks 52 are formed at the interval (1), the elastic hooks 52 may be simultaneously separated from the hook holes 44 or simultaneously coupled to the hook holes 44.

The structure of the elastic hook 52 is not specially limited. For example, as shown in FIG. 4, the elastic hook 52 is formed to be elastically deformable and is also inclined to be eccentric toward the upper end of the second pressure adjustment bar 50, namely toward the first end plate 20.

Since the elastic hook 52 is provided as above, as shown in FIG. 6, each elastic hook 52 may be elastically coupled with any one hook hole 44 corresponding thereto, among the plurality of hook holes 44.

Next, the restoration member 60 is installed between the first end plate 20 and the second end plate 30. The structure of the restoration member 60 is not specially limited. For example, as shown in FIG. 3, the restoration member 60 may be configured with a tension spring.

An installation method of the restoration member 60 is not specially limited. For example, as shown in FIG. 5, in a state where the restoration member 60 is accommodated in the accommodation space 42 of the first pressure adjustment bar 40, one end of the restoration member 60 may be fixed to the upper end of the first pressure adjustment bar 40, and the other end of the restoration member 60 which is opposite to the one end may be fixed to the upper end of the second pressure adjustment bar 50.

The restoration member 60 gives a restoration force in a direction along which the first pressure adjustment bar 40 and the second pressure adjustment bar 50 approach each other. In addition, by means of the first pressure adjustment bar 40 and the second pressure adjustment bar 50, a restoration force is also provided between the first end plate 20 and the second end plate 30 in a direction along which the first end plate 20 and the second end plate 30 approach each other.

Meanwhile, even though it has been illustrated that the restoration member 60 is accommodated in the accommodation space 42 so that its one end is fixed to the upper end of the first pressure adjustment bar 40 and the other end is fixed to the upper end of the second pressure adjustment bar 50, the present disclosure is not limited thereto. In other words, the restoration member 60 may be installed in various ways to give a restoration force between the first end plate 20 and the second end plate 30, for example by fixing its one end to the first end plate 20 and the other end to the second end plate 30.

Figure 7:
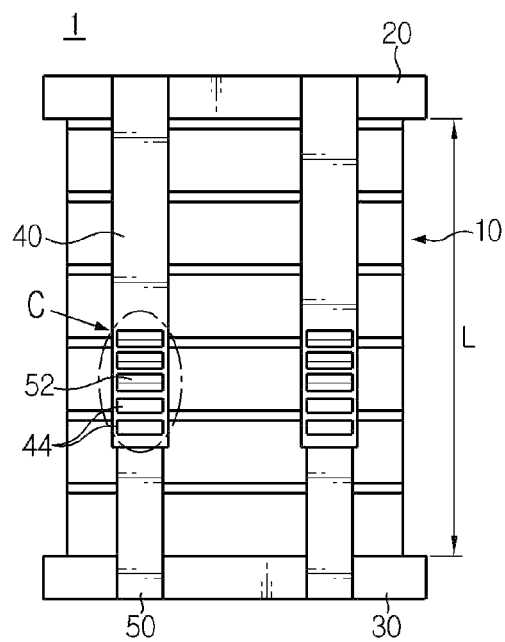
FIG. 7 is a side view showing a battery pack in a state of being not expanded.
Figure 8:
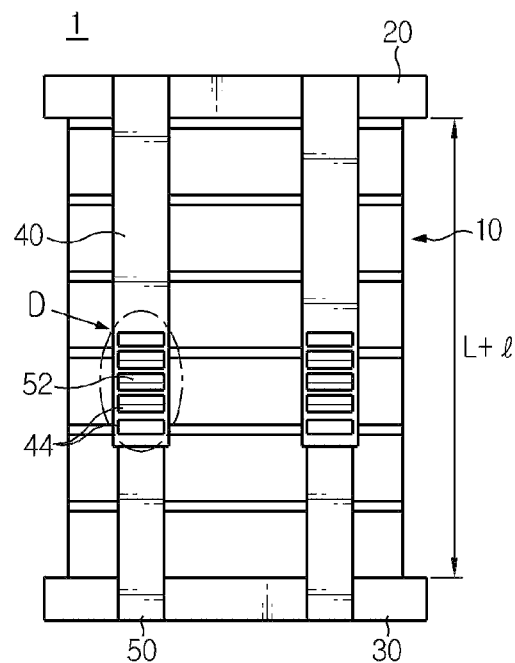
FIG. 8 is a side view showing a battery pack in a state of being expanded.
Figure 9:
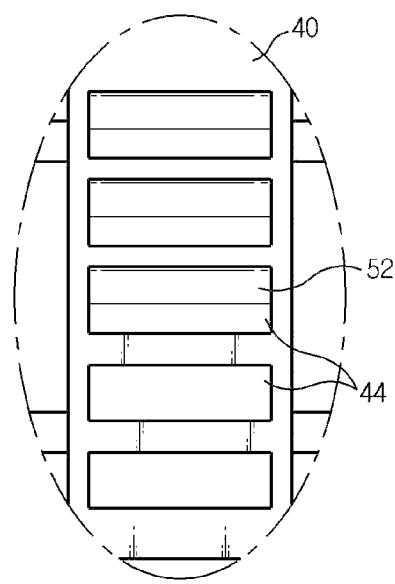
FIG. 9 is a partially enlarged view showing Region C of FIG. 7.
Figure 10:
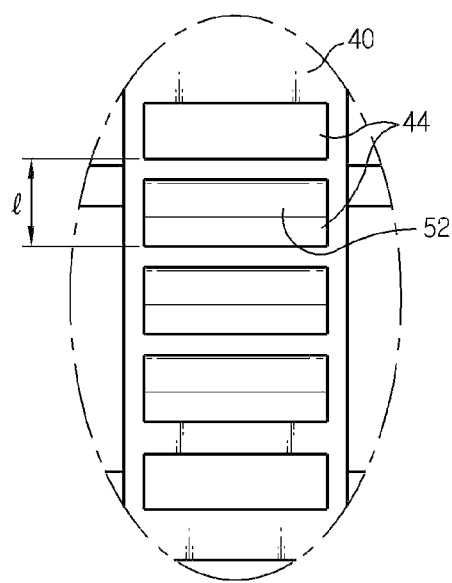
FIG. 10 is a partially enlarged view showing Region D of FIG. 8.

FIG. 7 is a side view showing a battery pack in a state of being not expanded, FIG. 8 is a side view showing a battery pack in a state of being expanded, FIG. 9 is a partially enlarged view showing Region C of FIG. 7, and FIG. 10 is a partially enlarged view showing Region D of FIG. 8.

Hereinafter, it will be described with reference to the drawings that a pressure applied to the battery module assembly 10 is adjusted by means of the first pressure adjustment bar 40 and the second pressure adjustment bar 50 when a swelling phenomenon occurs to expand the battery module assembly 10.

As described above, each elastic hook 52 of the second pressure adjustment bar 50 is elastically coupled to any corresponding one of the hook holes 44 of the first pressure adjustment bar 40. Then, as shown in FIG. 7, the first end plate 20 and the second end plate 30 are fixed due to the first pressure adjustment bar 40 and the second pressure adjustment bar 50 so that an interval (L) between the first end plate 20 and the second end plate 30 is maintained consistently.

However, if a swelling phenomenon occurs so that the battery module assembly 10 is expanded, a pressure applied between the battery module assembly 10 and the first end plate 20 and a pressure applied between the battery module assembly 10 and the second end plate 30 are increased, respectively.

Here, as described above, the first end plate 20 is installed in a no-load state, and the first end plate 20 is installed to be fixed to an installation target at which the battery pack 1 according to the present disclosure is installed. Therefore, if the battery module assembly 10 is expanded, the battery module assembly 10 lifts the first end plate 20 in an upper direction. Then, as shown in FIG. 8, the first pressure adjustment bar 40 is pulled by the first end plate 20 in a upper direction of the battery module assembly 10, and thus each elastic hook 52 comes into contact with the inner surface of the hook hole 44 elastically coupled thereto, thereby receiving a predetermined force.

If the force applied to each elastic hook 52 increases over a certain level, each elastic hook 52 is elastically deformed to be pressed flat due to the inner surface of each hook hole 44, and is then separated from each hook hole 44. Then, the second pressure adjustment bar 50 and each elastic hook 52 slide along the accommodation space 42 of the first pressure adjustment bar 40.

In case where the second pressure adjustment bar 50 and each elastic hook 52 move as described above, if the second pressure adjustment bar 50 and each elastic hook 52 move as much as the interval of the hook holes 44, each elastic hook 52 comes into contact with another hook hole 44. Then, elastic deformation of each elastic hook 52 is released, and thus the elastic hook 52 is elastically coupled to the hook hole 44 which is newly contacted. In other words, as shown in FIGS. 9 and 10, when the second pressure adjustment bar 50 slides along the accommodation space 42 of the first pressure adjustment bar 40, each elastic hook 52 is separated from any one of the hook holes 44 and then elastically coupled to another elastic hook 52. By doing so, the second pressure adjustment bar 50 is stopped after moving as much as the interval (1) of the hook hole 44, and the interval (L+1) between the first end plate 20 and the second end plate 30 increases as much as the interval (1) of the hook holes 44, in comparison to the case before the second pressure adjustment bar 50 slides.

As described above, in the battery pack 1 according to the present disclosure, when a swelling phenomenon occurs so that the battery module assembly 10 is expanded, the interval (L) between the first end plate 20 and the second end plate 30 may be automatically adjusted step by step as much as the interval (1) of the hook holes 44. Therefore, the pressure applied between the end plates 40, 50 and the battery module assembly 10, increased by the swelling phenomenon, is decreased as the interval (L) between the first end plate 20 and the second end plate 30 is automatically adjusted step by step, and thus the pressure may be automatically adjusted below a certain level. As a result, the battery pack 1 according to the present disclosure may effectively prevent the components of the battery pack 1 according to the present disclosure from being deformed due to the pressure applied between the end plates 20, 30 and the battery module assembly 10, increased by a swelling phenomenon.

Meanwhile, since the first pressure adjustment bar 40 and the second pressure adjustment bar 50 are connected by the restoration member 60 as described above, a restoration force of the restoration member 60 is provided between the first pressure adjustment bar 40 and the second pressure adjustment bar 50 in a direction along which the first pressure adjustment bar 40 and the second pressure adjustment bar 50 approach each other. In other words, an expansion force of the battery module assembly 10 and a restoration force of the restoration member 60 are respectively applied to the first pressure adjustment bar 40 and the second pressure adjustment bar 50.

Then, when a swelling phenomenon occurs so that the second pressure adjustment bar 50 moves, at least a part of the expansion force of the battery module assembly 10 is offset by the restoration force of the restoration member 60. By doing so, the second pressure adjustment bar 50 gradually slides along the accommodation space 42 of the first pressure adjustment bar 40. Therefore, the restoration member 60 may prevent the second pressure adjustment bar 50 from rapidly moving and thus abruptly changing the pressure applied between the end plates 20, 30 and the battery module assembly 10. In addition, the restoration member 60 may prevent the interval between the first pressure adjustment bar 40 and the second pressure adjustment bar 50 from increasing infinitely, by connecting the first pressure adjustment bar 40 and the second pressure adjustment bar 50 to each other.

Meanwhile, the restoration force of the restoration member 60 is transferred to the battery module assembly 10 via the pressure adjustment bars 40, 50 and the end plates 20 30, and if the restoration force of the restoration member 60 is always applied to the battery module assembly 10, a bad influence may be applied to the battery module assembly 10. However, if the elastic hook 52 of the second pressure adjustment bar 50 is coupled to the hook hole 44 of the first pressure adjustment bar 40, a restoration force of the composite member is applied to the elastic hook 52 and the hook hole 44 coupled thereto and thus entirely offset. Therefore, the restoration force of the restoration member 60 is selectively applied to the assembly of the battery module 12 only when the elastic hook 52 is separated from the hook hole 44 and thus the second pressure adjustment bar 50 is moving, and thus it is possible to prevent the battery module assembly 10 from being damaged due to the restoration force of the restoration member 60.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A battery pack, comprising:
a battery module assembly having a plurality of secondary batteries;
a first end plate installed at one end of the battery module assembly;
a second end plate installed at the other end of the battery module assembly, which is opposite to the one end;
a first pressure adjustment bar fixed to the first end plate to be located between the first end plate and the second end plate; and
a second pressure adjustment bar fixed to the second end plate to be slidably inserted into the first pressure adjustment bar,
wherein the first pressure adjustment bar includes:
an accommodation space formed so that the second pressure adjustment bar is slidably inserted therein; and
a plurality of hook holes formed along a sliding direction of the second pressure adjustment bar to communicate with the accommodation space,
wherein the second pressure adjustment bar has an elastic hook elastically coupled to any one of the hook holes selectively so that when the second pressure adjustment bar slides along the accommodation space, the second pressure adjustment bar is released from any one of the hook holes and then coupled to another one of the hook holes.

2. The battery pack according to claim 1,
wherein there is provided a plurality of elastic hooks, and the number of the elastic hooks is smaller than the number of the hook holes.

3. The battery pack according to claim 2,
wherein the hook holes are formed at a predetermined interval, and
wherein the elastic hooks are formed at an interval corresponding to an integer multiple of the predetermined interval of the hook holes.

4. The battery pack according to claim 1,
wherein the elastic hook has an end eccentrically inclined toward the first end plate.

5. The battery pack according to claim 1, further comprising:
a restoration member configured to give a restoration force in a direction along which so that the first end plate and the second end plate approach each other.

6. The battery pack according to claim 5,
wherein the restoration member is made of a tension spring.

7. The battery pack according to claim 6,
wherein the restoration member is accommodated in the accommodation space and has one end fixed to the first pressure adjustment bar and the other end fixed to the second pressure adjustment bar.

* * * * *